Sept. 23, 1941.     D. E. REED     2,256,763
MOUNTING FOR VEHICLE ACCESSORIES SUCH AS REARVIEW MIRRORS AND THE LIKE
Filed Feb. 28, 1941
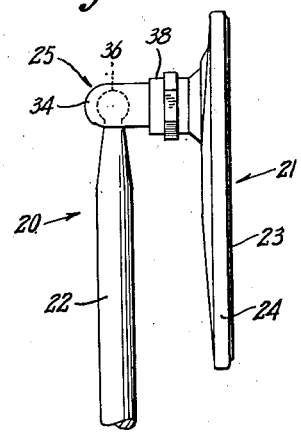
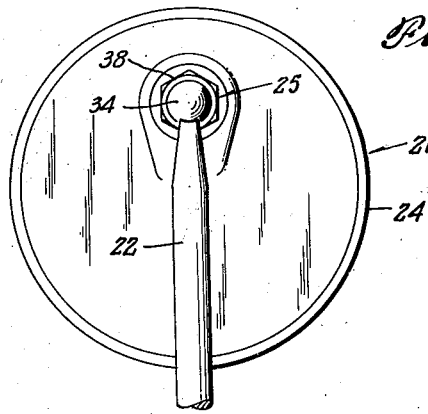
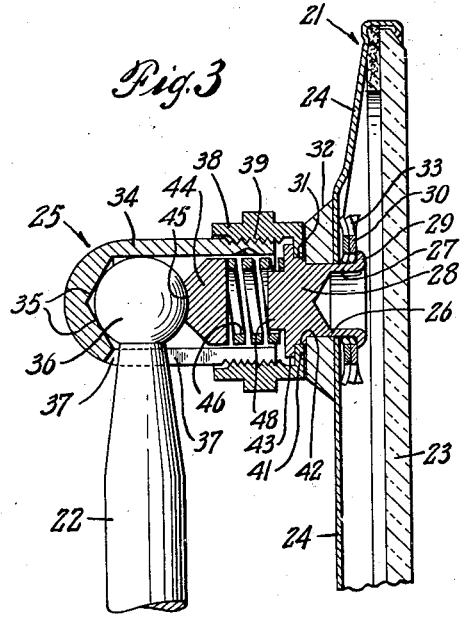
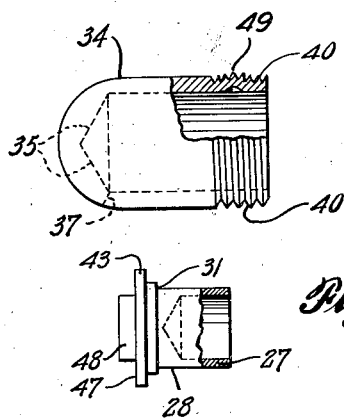
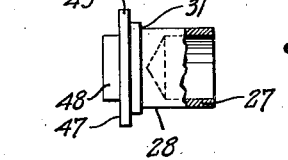
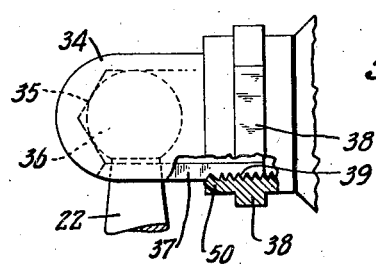
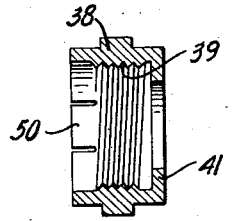
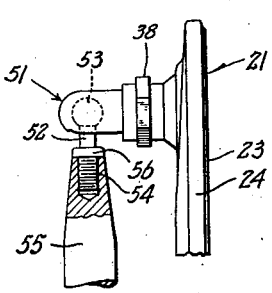
INVENTOR
Daniel E. Reed
BY
ATTORNEY Patented Sept. 23, 1941

2,256,763

UNITED STATES PATENT OFFICE 2,256,763

MOUNTING FOR VEHICLE ACCESSORIES SUCH AS REARVIEW MIRRORS AND THE LIKE

Daniel E. Reed, Norwalk, Conn., assignor to Yankee Metal Products Corp., Norwalk, Conn., a corporation of New York Application February 28, 1941, Serial No. 380,989

8 Claims. (Cl. 248—276)

This invention relates to automobile accessories, such as rearview mirrors, and to mounting means for the same. It relates particularly to a novel ball-and-socket connection in the mounting means.

Heretofore rearview mirrors have been positioned on brackets by means of ball and socket joints which were tightened by means of threaded portions. However, difficulty has been experienced because the gravitational forces, the jolting of the automobile, and the frequent repositioning of the mirror relative to the bracket have caused the threaded portions to adversely loosen. This has not only been inconvenient, but it has also been dangerous, inasmuch as the driver of an automobile has not been able to see the traffic behind his car whenever the mirror has thus been displaced from its correct position. Because the displacement of the mirror from its set position often has not been noticed until the need for the mirror has been urgent, and because an emotional reaction of surprise and fear has resulted from the discovery of the drooping mirror, automobile accidents have been and/or could be caused by such displacement of the mirror.

Heretofore there have been ball and socket joints adapted to provide adequate freedom of movement for a mirror. However, it has been found that many of the ball and socket joints now in use tend to loosen and wear out more quickly than desired when thus given the function of enabling all the necessary adjustments for the mirror.

It is an important object of the present invention to provide an automobile accessory mounting including a ball and socket joint, adapted to provide very satisfactory adjustment of the accessory and which will not loosen during extended use.

Other objects of the present invention are: to prolong the life of a spring seat in a mounting of the above type; to simplify the manufacture and assembly of a rearview mirror mounting device; to securely fasten a joint member to a mounting of the above type and to provide a durable mounting means permitting a great range of movement.

A feature of the present invention is the provision of a locking means in the threaded connection between the ball and socket members of a mounting.

Other features include: the provision in a ball and socket mounting for a mirror or the like of a helically disposed spring strip having a rectangular cross section, adapted to provide a large bearing surface against the spring seats and to increase the strength and spring tension of the relatively small spring which is used with the mounting; the provision of a particularly effective means adapted to securely hold a joint member to a casing; and other features which will hereinafter appear.

In the drawing:

Figure 1 is a side view of a mounting embodying the present invention.

Fig. 2 is a rear view of the mounting shown in Fig. 1.

Fig. 3 is a sectional view of the mounting shown in Fig. 1.

Figs. 4 and 5 illustrate details of the mounting shown in Fig. 3.

Fig. 6 is a fragmentary view, illustrating a modification of the invention.

Fig. 7 is a view illustrating a detail of the modification shown in Fig. 6.

Fig. 8 is a view similar to Fig. 1, but illustrating another modification of the present invention.

Before describing the present improvements and mode of operation thereof in detail it should be understood that the invention is not limited to the details of construction and arrangement of parts shown in the accompanying drawing, which are merely illustrative of the present preferred embodiments, since the invention is capable of other embodiments, and the phraseology employed is for the purpose of description and not of limitation.

Referring more particularly to the drawing and first to Figs. 1 through 5, there is shown for the purpose of illustrating an embodiment of the present invention a mounting 20 providing a substantially universal support for an automobile accessory, especially a rearview mirror 21, on a bracket in the form of a supporting arm 22.

As is usual in devices of this type, the mirror 21 includes a reflecting member 23 suitably held in a casing 24 to which by a universal or substantially universal connecting means 25 there is secured the supporting arm 22. Of importance, however, the universal connecting means 25 provided by the present invention is such that it not only permits a wide range of adjustment between the mirror and the supporting arm but it is especially effective in maintaining the mirror in any given position of adjustment once it has been moved thereto.

In thus providing this advantageous universal connecting means a suitable opening 26, preferably off center relative to the mirror, is formed in the casing. Extending into this opening there is a tubular shank portion 27 of a swivel stud 28 which is securely fixed relative to the casing by peened or rolled over portion 29 at the free end of the tubular shank overlying and engaging superposed shakeproof washers 30 on the inside of the casing, and by a peripheral shoulder 31 on the stud and overlying a spacing and supporting member 32 of washerlike form located on the shank portion and engaging the outer side of the casing. It will be readily appreciated that the assembly of the swivel stud and the casing is effected prior to the insertion of the reflecting member 23 in the latter. Preferably, and as shown, in order to provide a more advantageous locking between the swivel stud and the casing the shakeproof washers 30 are of the type including radially extending and angularly deformed fingers 33.

Connecting the swivel stud 28 with the supporting arm is a cap member 34, the closed end of which provides internal bearing surfaces 35 for engaging a ball-like member 36 provided on the end of the supporting arm 22 extending through a slot 37 formed in the side wall of the cap and extending from adjacent the closed end thereof to the open end thereof.

For maintaining the cap member 34 in association with the swivel stud 28 there is provided a connecting collar 38 having internal threads 39 formed therein adapted to engage with external threads 40 formed on the cap member 34, and having an inwardly extending peripheral flange 41 at one end adapted to be confined in an annular recess 42 defined between the spacing member 32 and an outwardly extending peripheral flange 43 on the swivel stud. With this construction, it will be appreciated, by properly proportioning the flange 41 and the recess 42, the casing and swivel stud as a unit may be readily rotated relative to the connecting collar and the cap as a unit.

For maintaining the ball-like member 36 in engagement with the bearing surfaces 35 there is provided within the cap a holding or floating bearing member 44. One side of the member 44 is formed with a bearing surface 45 for engaging the ball-like member, and the opposite side is engaged by a preferably helically disposed spring strip 46 seated on an annular surface 47 on the swivel stud 28. The spring strip serves to yieldingly urge the holding member and ball-like member toward the bearing surfaces 35. A contractible or yielding socket is thus provided for gripping the ball-like member. Advantageously the swivel stud is formed with a spring centering extension 48 which projects upwardly within the spring.

Preferably and advantageously the helically disposed spring strip 46 is formed of rectangular as distinguished from circular cross section. With the use of a spring strip of rectangular and preferably square cross section increased spring tension and strength are provided in the spring which must be small enough for confinement in a relatively small space within the cap. This is of importance because despite its small size the spring must withstand much vibration and jolting, must be sufficiently strong to effectively maintain the holding member 44 against the ball-like member 36, and should have a long effective life notwithstanding the metallic fatigue producing influences of vibration and jolting. Moreover, because of the rectangular cross section an increased bearing surface is provided between the spring and the holding member 44 on the one hand and between the spring and the annular seating surface 47 on the other hand. Hence the spring seating surfaces, which are often of somewhat softer material than the spring, are not as readily worn away as when a spring member of round cross section is utilized. Accordingly the need for frequently adjusting and tightening the collar 38 to compensate for spring seat wear is obviated.

With the construction above described it is possible to adjust the position of the mirror relative to the supporting arm not only by movement of the cap on the ball-like member but also by rotating movement of the mirror and swivel stud relative to the connecting collar 38. Because of the utilization of the spring 46 the ball-like member is held sufficiently firmly in the socket provided by the cap seating bearing and the bearing surface on the holding member to maintain the mirror in selected positions of adjustment, while at the same time permitting a ready adjustment of the ball and socket joint connecting the mirror and the supporting arm. Likewise the spring serves to maintain the flange 41 on the connecting collar in frictional engagement with the flange 43 on the swivel stud, to thus effectively maintain the mirror in a selected position of rotative adjustment determined by turning the mirror and the swivel stud relative to the collar and cap. At the same time, because of the yielding nature of the spring any desired rotative adjustment of the mirror and the swivel stud may be readily affected. Due to the fact that the spring possesses substantial strength, adjustment of the mirror by means of either the ball and socket joint or the swivel joint may be effected without adversely affecting the setting of the other joint.

To prevent any tendency for the threaded connection between the cap and the collar to become adversely loosened as by vibration or by repeated adjustments of the mirror and the swivel stud relative to the collar, there is provided as an important feature of the present invention a locking means between the collar and cap. As shown most clearly in Figs. 3 and 4 this locking means may be, and preferably is, provided by forming a distorted or outwardly projecting portion 49 in the threaded section of the cap. The disposition of this projecting portion is such that it will not engage the collar until the latter and the cap have been substantially screwed together. Further screwing up of the cap and collar by a suitable tool such as a wrench, however, will cause the projecting portion to frictionally engage or bite into the internal threads on the collar, thus effectively locking the collar and the cap against adversely becoming loosened relative to each other, due to vibration or to the normal adjustments of the mirror. While the provision of the projecting portion does serve to effectively lock or bind the collar and cap relative to each other, the locking of the collar and the cap is such that if for any reason it should be desired to disassemble these elements or to further screw up the cap and collar, as if it should be desired to adjust the compression of the spring, this may be accomplished by employing a wrench or other tool.

If desired and as shown in Figs. 6 and 7, a modified form of locking means between the collar and cap may be provided, by slotting a portion of the holding collar wall to form a finger 56 which, after the collar and cap have been screwed together, may be bent inwardly into the slot 37 formed in the cap. This modified locking means has the advantage of providing an even more effective lock than the locking means first described. However, because of the greater simplicity of the first-described locking means and because of the fact that it does function in a very effective manner, it may be preferred over the modified form of locking means.

While as disclosed in Figs. 1 through 5, the ball-like member may be formed integral with the supporting arm it will be appreciated that this ball-like member may be embodied in a separate adaptor unit which is secured to the supporting arm. Thus, and as shown in Fig. 8, a unit 51 involving a relatively short shank 52 with a ball-like member 53 on one end and a threaded stud section 54 on the other end may be provided for screwing into a threaded socket in the end of a supporting arm 55. A flangelike portion 56 preferably is provided between the shank and threaded stud sections to seat on the upper end of the main supporting arm.

The above described modified construction involving the unit 51 is advantageous in that it permits the mounting 20 provided by the present invention to be readily associated with divers supports even though those supports not be initially formed with a ball-like member on the end thereof.

Variations and modifications may be made within the scope of this invention and portions of the improvements may be used without others.

Having thus described the invention, what is claimed as new is:

1. In a mounting, the combination of an automobile accessory casing having an opening; a shakeproof washer; a swivel stud extending through the opening; shoulder means for arresting movement of said stud into said opening; a pressed over portion on said swivel stud engaging said shakeproof washer on the inside of said casing and cooperating with said shoulder means in fixing said stud relative to said casing; a collar mounted for turning movement on said stud; flange means on said stud and said collar for arresting longitudinal movement of the latter away from said stud; a ball receiving cap; interengaging threaded sections on said collar and cap and connecting the same; a ball in said cap, adapted to be connected to a supporting member; and a projecting portion on one of said threaded sections, for engaging and locking with the other of said threaded sections when the collar and cap are screwed together.

2. In a mounting of the class described for connecting a vehicle accessory member such as a rearview mirror to a support, the combination of a cap having a ball seating surface therein; a ball in said cap, connected to said support; a floating element in said cap; a swivel stud connected to and extending from said accessory member; a connecting collar mounted for turning movement on said swivel stud; interengaging threaded sections on said collar and cap and connecting the same; flange means on said stud and collar, for arresting relative longitudinal sliding movement therebetween in one direction; and a helically disposed spring strip of rectangular cross section, interposed between said floating element and said stud, for yieldingly urging the ball against said ball seating surface and for yieldingly maintaining said flange means in frictional engagement with each other.

3. In a mounting of the class described for connecting a vehicle accessory member such as a rearview mirror to a supporting member, the combination of a cap with a slot, having a ball seating surface therein; a ball in said cap, adapted to be connected to one of said members through said slot; a swivel stud connected to the other of said members; a connecting collar mounted for turning movement on said swivel stud, said cap and said collar having interengaging threaded sections; and means on one of said collar and said cap elements and projecting outwardly in the threaded section thereof, for effecting a wedging lock with the other of said collar and cap elements to maintain the same against unforced unscrewing relative to each other.

4. In a mounting of the class described for connecting a vehicle accessory member such as a rearview mirror to a supporting member, the combination of a cap with a slot, having a ball seating surface therein; a ball in said cap, adapted to be connected to one of said members through said slot; a swivel stud extending from the other of said members; a connecting collar in screw threaded relation with said cap, and mounted for rotating movement on said swivel stud; a spring pressed member in said cap, together with said ball seating surface providing a yielding and gripping socket means for said ball member; and interengaging means on said cap and said collar for maintaining the same against adverse unscrewing relative to each other.

5. In a mounting of the class described for connecting a vehicle accessory member such as a rearview mirror to a support, the combination of a cap with a slot, having a ball seating surface therein; a ball in said cap; an adaptor unit, having a portion extending through said slot and connected to said ball; a threaded portion on said unit, adapted to be screwed in the support; flange means on said unit, intermediate said extending portion and said threaded portion, adapted to seat on the support; means in said cap for maintaining said ball against said seating surface; a swivel stud connected to said accessory member; and a connecting collar in screw threaded relation with said cap, and mounted for rotating movement on said swivel stud.

6. In a mounting of the class described for connecting a vehicle accessory member such as a rearview mirror to a supporting member, the combination of a cap with a slot, having a ball seating surface therein; a ball in said cap, adapted to be connected to one of said members through said slot; means including a connecting collar and interengaging threaded sections on said cap and said collar, for connecting said cap to the other of said members; and finger means on said collar, initially clear of said slot and adapted to be moved into said slot for maintaining the collar and cap against unscrewing movement relative to each other.

7. In a mounting of the class described for connecting a vehicle accessory member to a supporting member, the combination of a cap, having a ball seating surface therein; a ball in said cap, adapted to be connected to one of said members; a swivel stud connected to and extending from the other of said members; a connecting collar mounted for turning movement on said swivel stud; interengaging threaded sections on said collar and cap and connecting the same; flange means on said stud and collar, for arresting relative longitudinally sliding movement therebetween in one direction; and a helically disposed spring strip of rectangular cross section, interposed between said stud and said ball for yieldingly urging the latter against said ball seating surface and for yieldingly maintaining said flange means in frictional engagement with each other.

8. In a mounting of the class described for connecting a vehicle accessory member such as a rearview mirror to a supporting member, the combination of a cap with a slot, having a ball seating surface therein; a ball in said cap, adapted to be connected to one of said members through said slot; a swivel stud extending from the other of said members; a connecting collar in screw threaded relation with said cap, and mounted for rotating movement on said swivel stud; and inter-engaging means on said cap and said collar for maintaining the same against adverse unscrewing relative to each other.

DANIEL E. REED.